(12) United States Patent
Ouyang (10) Patent No.: US 12,135,713 B2
(45) Date of Patent: Nov. 5, 2024

(54) EFFICIENTLY ACCESSING SHARED OPERATORS IN DATABASE QUERY PLANS

(71) Applicant: SAP SE, Walldorf (DE)

(72) Inventor: Yinghua Ouyang, Xi'an (CN)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 17/985,294

(22) Filed: Nov. 11, 2022

(65) Prior Publication Data

US 2024/0160627 A1    May 16, 2024

(51) Int. Cl.
*G06F 16/2453* (2019.01)
*G06F 11/34* (2006.01)

(52) U.S. Cl.
CPC .... *G06F 16/24542* (2019.01); *G06F 11/3409* (2013.01); *G06F 16/24537* (2019.01)

(58) Field of Classification Search
CPC ........... G06F 16/24542; G06F 11/3409; G06F 16/24537
See application file for complete search history.

(56) References Cited

U.S. PATENT DOCUMENTS

| | | | | |
|---|---|---|---|---|
| 6,728,955 B1* | 4/2004 | Berry | ................. | G06F 11/3466 714/E11.2 |
| 6,978,271 B1* | 12/2005 | Hoffman | ................. | G06F 16/13 707/999.102 |
| 10,545,984 B2 | 1/2020 | Zhang et al. | | |
| 11,061,927 B2 | 7/2021 | Ouyang et al. | | |
| 11,379,477 B2 | 7/2022 | Ouyang et al. | | |
| 11,423,024 B2 | 8/2022 | Ouyang et al. | | |
| 2011/0137930 A1* | 6/2011 | Hao | ................... | G06F 16/9024 707/769 |
| 2018/0089270 A1* | 3/2018 | Qiu | ................... | G06F 16/24542 |
| 2020/0301901 A1 | 9/2020 | Hao et al. | | |

OTHER PUBLICATIONS

Cole et al, Optimization of Dynamic Query Evaluation Plans, SiGMOD 94-5/94 Mh_tneapolis, Minnesota, USA, pp. 150-160, 1994. (Year: 1994).*
Giannikis et al., Shared Workload Optimization, 40th International Conference on Very Large Data Bases, Sep. 1 5, 2014, Hangzhou, China. Proceedings of the VLDB Endowment, vol. 7, No. 6, pp. 429-440. (Year: 2014).*
U.S. Appl. No. 17/462,121, Ouyang, filed Aug. 31, 2021.
Wikipedia.org [online] "Query plan" created on Apr. 2005, retrieved on Oct. 25, 2022, retrieved from URL <https://en.wikipedia.org/wiki/Query_plan>, 3 pages.

* cited by examiner

*Primary Examiner* — Cheyne D Ly
(74) *Attorney, Agent, or Firm* — Fish & Richardson P.C.

(57) ABSTRACT

The present disclosure involves systems, software, and computer implemented methods for efficiently accessing shared operators in database query plans. One example method includes identifying a query plan tree that represents a query plan for a database query. A node identifier of each node of the query plan tree is initialized to a default node identifier value and a global node identifier counter for the query plan tree is initialized. The query plan tree is traversed including determining whether a node identifier of a current node equals the default node identifier value. If the node identifier of the current node equals the default node identifier value, the current node is processed, the node identifier of the current node is set to a current value of the global node identifier counter, and the global node identifier counter is incremented. Otherwise processing of the current node is skipped.

20 Claims, 4 Drawing Sheets

EFFICIENTLY ACCESSING SHARED OPERATORS IN DATABASE QUERY PLANS

TECHNICAL FIELD

The present disclosure relates to computer-implemented methods, software, and systems for efficiently accessing shared operators in database query plans.

BACKGROUND

A query engine can receive a query to execute against a database. The query engine can generate a query plan to execute the query. A chosen query plan can include a sequence of steps to implement execution of the received query. The chosen query plan may be one of multiple possible query plans. The query engine can determine or select a given query plan based on database performance concerns or goals, for example.

SUMMARY

The present disclosure involves systems, software, and computer implemented methods for efficiently accessing shared operators in database query plans. An example method includes: identifying a query plan tree that represents a query plan for a database query; initializing a respective node identifier of each node of the query plan tree to a default node identifier value; initializing a global node identifier counter for the query plan tree; and traversing the query plan tree, wherein the traversing includes: determining whether a node identifier of a current node equals the default node identifier value; in response to determining that the node identifier of the current node equals the default node identifier value: processing the current node; setting the node identifier of the current node to a current value of the global node identifier counter for the query plan tree; and incrementing the global node identifier counter for the query plan tree; in response to determining that the node identifier of the current node does not equal the default node identifier value, skipping processing of the current node; determining whether the current node has any unvisited child nodes; traversing to a next child node of the current node in response to determining that the current node has at least one unvisited child node; determining whether all nodes of the query plan tree have been traversed; and traversing to a next node of the query plan tree in response to determining that at least one node of the query plan tree has not been traversed.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A query plan can be generated that represents a plan for executing a database query. The query plan can be represented as a query plan tree. For some queries, multiple parent nodes may share common child nodes. The shared child nodes can represent shared operators in the query plan. Processing of the multiple parent nodes can result in redundant processing of the shared child nodes, which can degrade database performance. For example, duplicated access of the shared child nodes during query execution can substantially reduce query execution performance. As an alternative to duplicate access of shared child nodes, an efficient approach for avoiding duplicated access of shared child nodes can be performed, which can substantially improve query execution performance.

Figure 1:
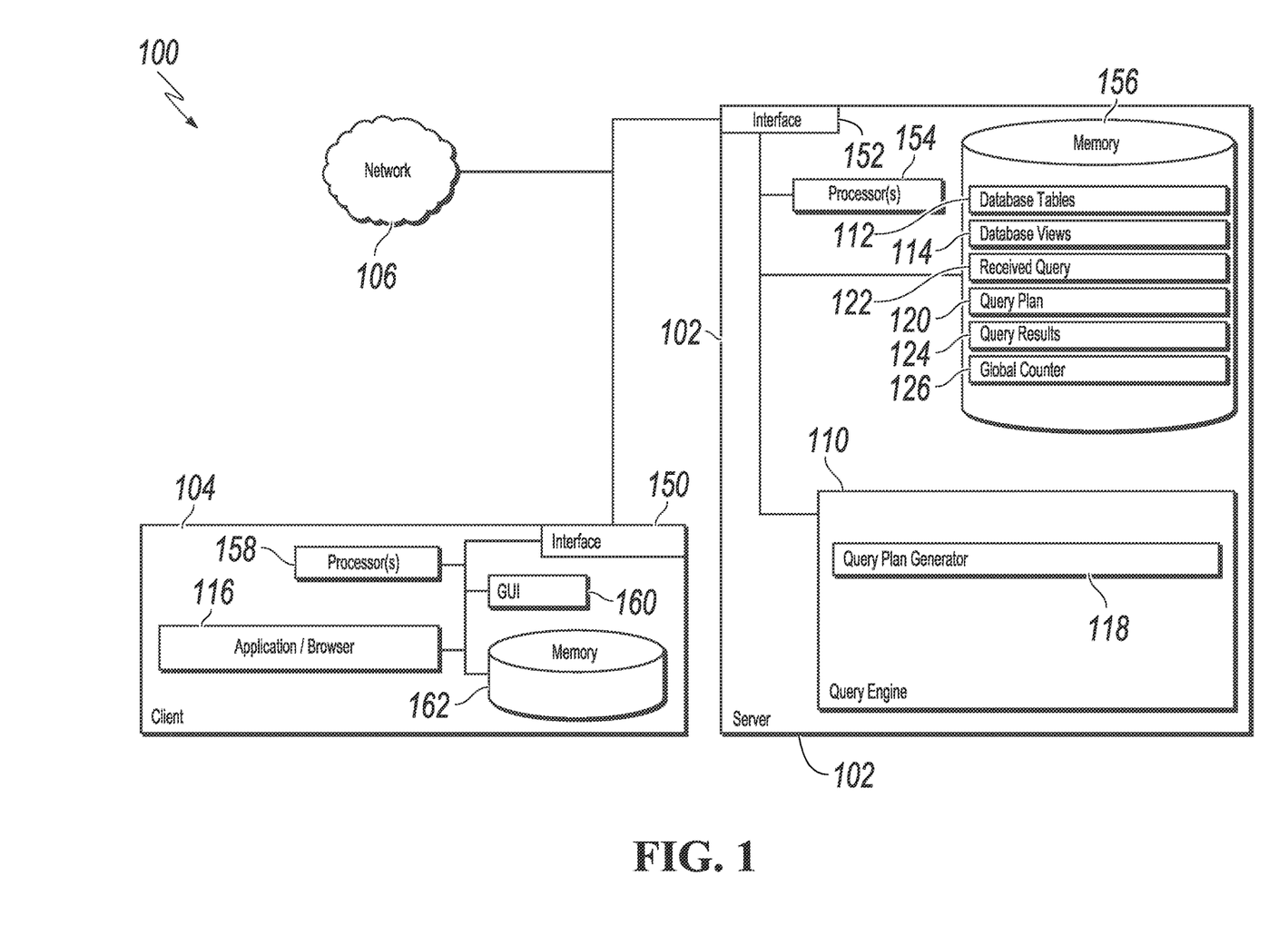
FIG. 1 is a block diagram illustrating an example system for efficiently accessing shared operators in database query plans.

FIG. 1 is a block diagram illustrating an example system 100 for efficiently accessing shared operators in database query plans. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A server 102 (e.g., a database server) includes a query engine 110. The query engine 110 can process received queries against database artifacts such as database tables 112, database views 114, etc. The query engine 110 can process queries based on requests received from an application/browser 116, from internal server processes, or other types of requests. A query plan generator 118 of the query engine can generate a query plan 120 based on a received query 122. The query engine 110 can execute the query plan 120 to generate query results 124. The query results can be provided to a requestor who provided the received query 122.

As described above, the query plan 120 can be represented as a query plan tree. The query engine 110 can navigate the query plan tree so as to avoid duplicate accessing of nodes that represent shared operators in the query plan. For example and as described in more detail below, the query engine 110 can traverse the query plan tree and determine whether a given node has been visited before by examining a node identifier of the node, and uniquely numbering the node after visiting the node using a global counter 126 to avoid duplicate processing of the node if the node is visited again via another parent node, for example. Accordingly, duplicate accessing of shared child nodes is avoided, thus improving performance of the query engine 110.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application/browser 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application/browser 116. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
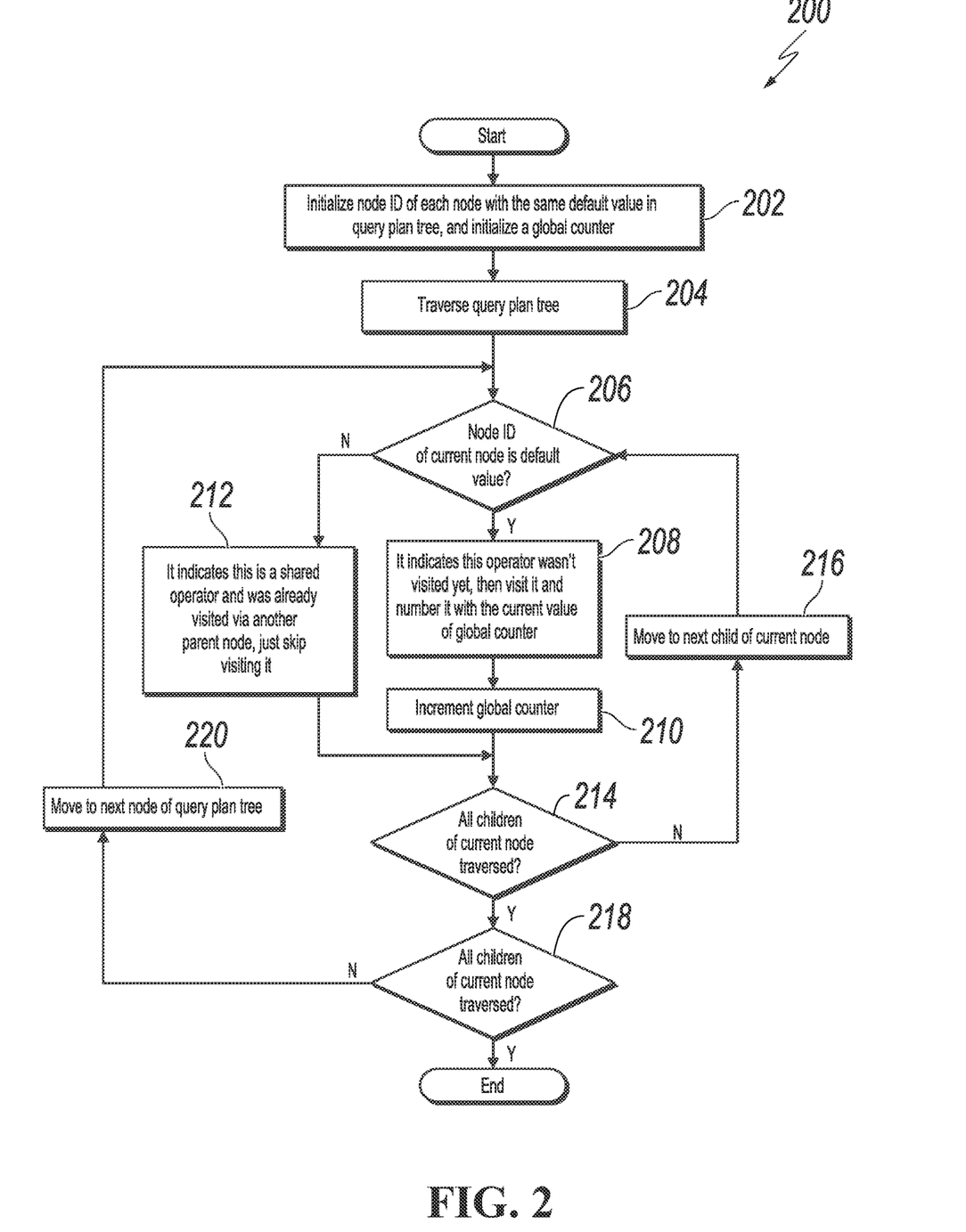
FIG. 2 is a flowchart of example process.

FIG. 2 is a flowchart of example process 200. The process 200 can be used for efficiently accessing shared operators in database query plans.

At 202, initialization steps are performed. Initializations steps can include initializing a node identifier of each node in a query plan tree is initiated to a same default value and initializing a global counter.

At 204, the query plan tree is traversed.

At 206, a determination is made, during traversal of the query plan tree, as to whether a node identifier of a current node of the query plan tree is equal to the default value.

At 208, in response to determining that the node identifier of the current node is equal to the default value, a determination is made that the current node has not yet been visited. Accordingly, the current node is visited and is numbered with the current value of the global counter.

At 210, the global counter is incremented.

At 212, in response to determining that the node identifier of the current node is not equal to the default value, a determination is made that the current node corresponds to a shared operator in the query plan and that the current node was already visited via another parent node. Accordingly, the current node is not re-visited.

At 214, a determination is made as to whether all children of the current node have been traversed.

At 216, in response to determining that all children of the current node have not been traversed, traversal of the query plan tree continues by moving to a next child of the current node. The next child of the current node becomes a new current node and the new current node is processed at step 206.

At 218, in response to determining that all children of the current node have been traversed, a determination is made as to whether all nodes of the query plan tree have been traversed. If all nodes of the query plan tree have been traversed, the process 200 can end.

At 220, in response to determining that not all children of the current node have been traversed, traversal of the query plan tree continues by moving to a next node of the query plan tree. The next node becomes a new current node and the new current node is processed at step 206.

Figure 3:
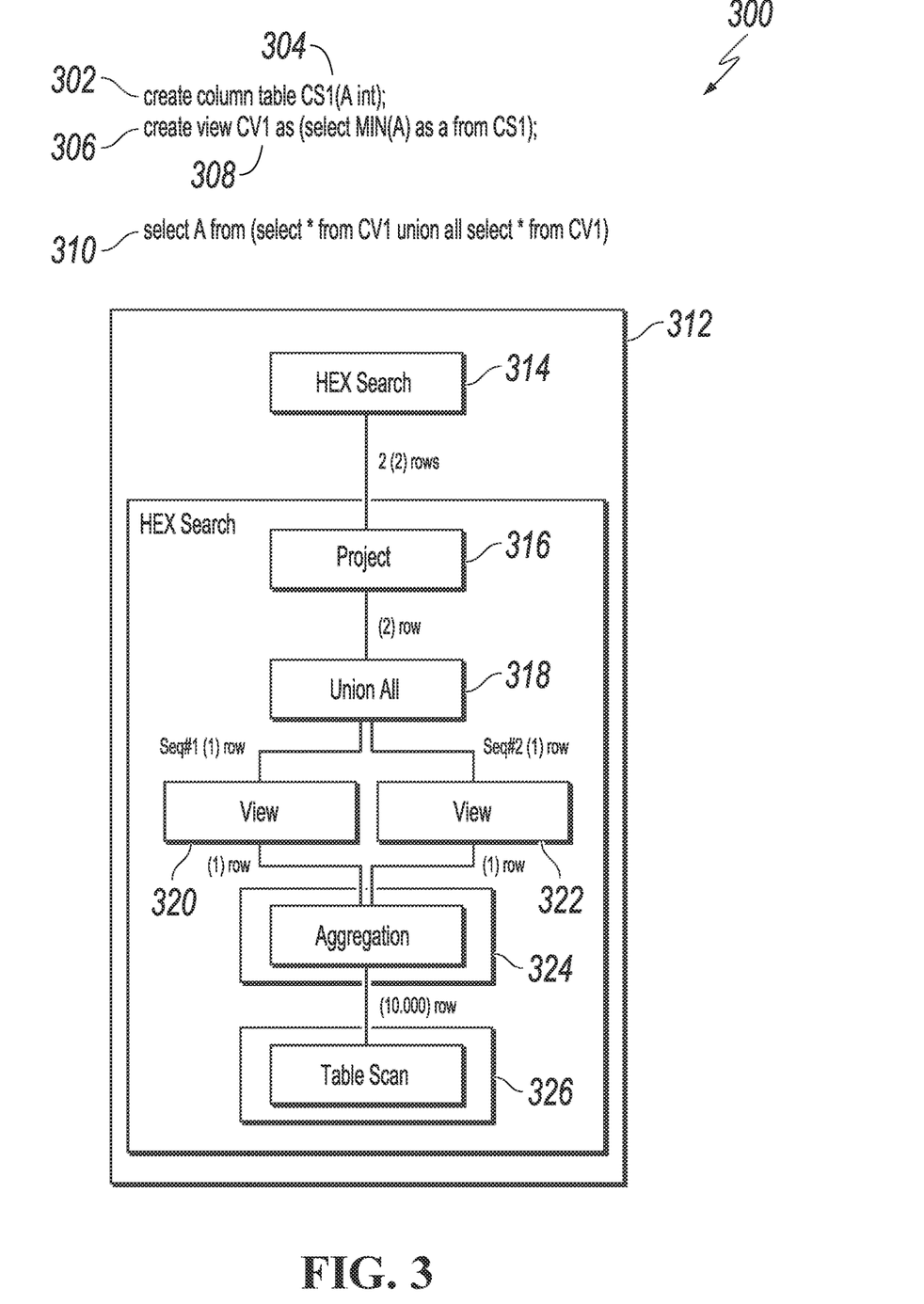
FIG. 3 is a diagram that illustrates an example of efficiently accessing shared operators in database query plans.

FIG. 3 is a diagram 300 that illustrates an example of efficiently accessing shared operators in database query plans. A create table statement 302 can be executed to create a CS1 table 304. A create view statement 306 can be executed to create a CV1 view 308. A query 310 is defined that is based on different instances of the CV1 view.

A graph 312 represents a query plan for the query 310. The graph 312 includes nodes 312-326 that each represent an operator included in the query plan. The nodes 324 and 326, representing aggregation and table scan operations, respectively, are shared child nodes that represent shared operators. For example, nodes 320 and 322, each representing a view operator of a view in the query 310, are each parent nodes to the nodes 324 and 326. The process 200 described above (and the method 400 described below) can each be performed to avoid duplicate accessing of the nodes 324 and 326 that correspond to shared operators.

Figure 4:
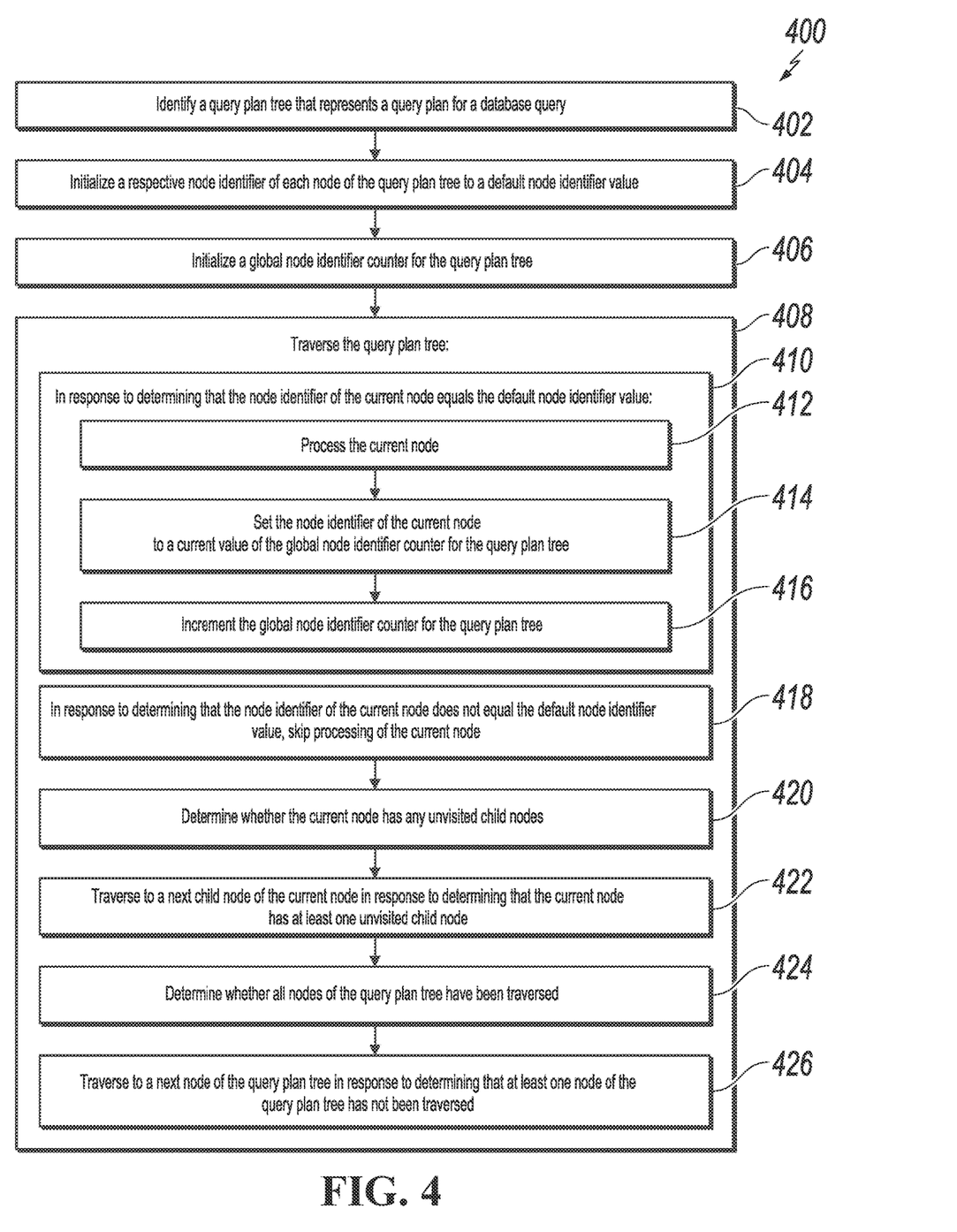
FIG. 4 is a flowchart of an example method for efficiently accessing shared operators in database query plans.

FIG. 4 is a flowchart of an example method for efficiently accessing shared operators in database query plans. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the query engine 110 of FIG. 1.

At 402, a query plan tree is identified that represents a query plan for a database query. Nodes of the query plan tree represent operators to be processed during execution of the query plan. The query plan tree can be a directed acrylic graph.

At 404, a respective node identifier of each node of the query plan tree is initialized to a default node identifier value.

At 406, a global node identifier counter for the query plan tree is initialized. Different global node identifier counters can be used for different query plan trees.

At 408, the query plan tree is traversed, which includes multiple steps.

At 410, a determination is made as to whether a node identifier of a current node equals the default node identifier value. Determining that the node identifier of the current node equals the default node identifier value corresponds to determining that an operator represented by the current node has not yet been processed. Different processing steps are performed in response to determining that the node identifier of the current node equals the default node identifier value. For example, at 412, the current node is processed (e.g., an operator of the query plan corresponding to the current node is processed).

At 414, the node identifier of the current node is set to a current value of the global node identifier counter for the query plan tree.

At 416, the global node identifier counter for the query plan tree is incremented.

At 418, in response to determining that the node identifier of the current node does not equal the default node identifier value, processing of the current node is skipped. Determining that the node identifier of the current node does not equal the default node identifier value corresponds to determining that an operator represented by the current node has already been processed. As another example, determining that the node identifier of the current node does not equal the default node identifier value corresponds to determining that the current node has multiple parent nodes and has already been visited based on processing of one of the parent nodes.

At 420, a determination is made as to whether the current node has any unvisited child nodes.

At 422, traversal of the query plan continues to a next child node of the current node in response to a determination that the current node has at least one unvisited child node.

At 424, a determination is made as to whether all nodes of the query plan tree have been traversed.

At 426, traversal of the query plan tree continues to a next node of the query plan tree in response to determining that at least one node of the query plan tree has not been traversed.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving, at a database system, a database query that queries at least one database artifact stored in the database system;
   generating, by a query plan generator of the database system, a query plan tree that represents a query plan for the database query;
   initializing, by a query engine of the database system and in memory of the database system, a respective node identifier of each node of the query plan tree to a default node identifier value;
   initializing, by the query engine of the database system and in the memory of the database system, a global node identifier counter for the query plan tree; and
   traversing, by the query engine of the database system, the query plan tree, wherein the traversing includes:
      determining, by the query engine of the database system, whether a node identifier of a current node equals the default node identifier value;
      in response to determining that the node identifier of the current node equals the default node identifier value:
         processing, by the query engine of the database system, the current node;
         setting, by the query engine of the database system and in the memory of the database system, the node identifier of the current node to a current value of the global node identifier counter for the query plan tree; and
         incrementing, by the query engine of the database system and in the memory of the database system, the global node identifier counter for the query plan tree;
      in response to determining that the node identifier of the current node does not equal the default node identifier value, skipping, by the query engine of the database system, processing of the current node;
      determining, by the query engine of the database system, whether the current node has any unvisited child nodes;
      traversing, by the query engine of the database system, to a next child node of the current node in response to determining that the current node has at least one unvisited child node;
      determining, by the query engine of the database system, whether all nodes of the query plan tree have been traversed; and
      traversing, by the query engine of the database system, to a next node of the query plan tree in response to determining that at least one node of the query plan tree has not been traversed.

2. The computer-implemented method of claim 1, wherein nodes of the query plan tree represent operators to be processed during execution of the query plan.

3. The computer-implemented method of claim 2, wherein determining that the node identifier of the current node equals the default node identifier value comprises determining that an operator represented by the current node has not yet been processed.

4. The computer-implemented method of claim 2, wherein determining that the node identifier of the current node does not equal the default node identifier value comprises determining that an operator represented by the current node has already been processed.

5. The computer-implemented method of claim 2, wherein determining that the node identifier of the current node does not equal the default node identifier value comprises determining that the current node has multiple parent nodes and has already been visited based on processing of one of the parent nodes.

6. The computer-implemented method of claim 1, wherein the query plan tree is a directed acrylic graph.

7. The computer-implemented method of claim 1, wherein different global node identifier counters are used for different query plan trees.

8. A system comprising:
   one or more computers; and
   a non-transitory computer-readable medium coupled to the one or more computers having instructions stored thereon which, when executed by the one or more computers, cause the one or more computers to perform operations comprising:
      receiving, at a database system, a database query that queries at least one database artifact stored in the database system;
      generating, by a query plan generator of the database system, a query plan tree that represents a query plan for the database query;
      initializing, by a query engine of the database system and in memory of the database system, a respective node identifier of each node of the query plan tree to a default node identifier value;
      initializing, by the query engine of the database system and in the memory of the database system, a global node identifier counter for the query plan tree; and traversing, by the query engine of the database system, the query plan tree, wherein the traversing includes:
  determining, by the query engine of the database system, whether a node identifier of a current node equals the default node identifier value;
  in response to determining that the node identifier of the current node equals the default node identifier value:
    processing, by the query engine of the database system, the current node;
    setting, by the query engine of the database system and in the memory of the database system, the node identifier of the current node to a current value of the global node identifier counter for the query plan tree; and
    incrementing, by the query engine of the database system and in the memory of the database system, the global node identifier counter for the query plan tree;
  in response to determining that the node identifier of the current node does not equal the default node identifier value, skipping, by the query engine of the database system, processing of the current node;
  determining, by the query engine of the database system, whether the current node has any unvisited child nodes;
  traversing, by the query engine of the database system, to a next child node of the current node in response to determining that the current node has at least one unvisited child node;
  determining, by the query engine of the database system, whether all nodes of the query plan tree have been traversed; and
  traversing, by the query engine of the database system, to a next node of the query plan tree in response to determining that at least one node of the query plan tree has not been traversed.

9. The system of claim 8, wherein nodes of the query plan tree represent operators to be processed during execution of the query plan.

10. The system of claim 9, wherein determining that the node identifier of the current node equals the default node identifier value comprises determining that an operator represented by the current node has not yet been processed.

11. The system of claim 9, wherein determining that the node identifier of the current node does not equal the default node identifier value comprises determining that an operator represented by the current node has already been processed.

12. The system of claim 9, wherein determining that the node identifier of the current node does not equal the default node identifier value comprises determining that the current node has multiple parent nodes and has already been visited based on processing of one of the parent nodes.

13. The system of claim 8, wherein the query plan tree is a directed acrylic graph.

14. The system of claim 8, wherein different global node identifier counters are used for different query plan trees.

15. A computer program product encoded on a non-transitory storage medium, the product comprising non-transitory, computer readable instructions for causing one or more processors to perform operations comprising:
  receiving, at a database system, a database query that queries at least one database artifact stored in the database system;
  generating, by a query plan generator of the database system, a query plan tree that represents a query plan for the database query;
  initializing, by a query engine of the database system and in memory of the database system, a respective node identifier of each node of the query plan tree to a default node identifier value;
  initializing, by the query engine of the database system and in the memory of the database system, a global node identifier counter for the query plan tree; and
  traversing, by the query engine of the database system, the query plan tree, wherein the traversing includes:
    determining, by the query engine of the database system, whether a node identifier of a current node equals the default node identifier value;
    in response to determining that the node identifier of the current node equals the default node identifier value:
      processing, by the query engine of the database system, the current node;
      setting, by the query engine of the database system and in the memory of the database system, the node identifier of the current node to a current value of the global node identifier counter for the query plan tree; and
      incrementing, by the query engine of the database system and in the memory of the database system, the global node identifier counter for the query plan tree;
    in response to determining that the node identifier of the current node does not equal the default node identifier value, skipping, by the query engine of the database system, processing of the current node;
    determining, by the query engine of the database system, whether the current node has any unvisited child nodes;
    traversing, by the query engine of the database system, to a next child node of the current node in response to determining that the current node has at least one unvisited child node;
    determining, by the query engine of the database system, whether all nodes of the query plan tree have been traversed; and
    traversing, by the query engine of the database system, to a next node of the query plan tree in response to determining that at least one node of the query plan tree has not been traversed.

16. The computer program product of claim 15, wherein nodes of the query plan tree represent operators to be processed during execution of the query plan.

17. The computer program product of claim 16, wherein determining that the node identifier of the current node equals the default node identifier value comprises determining that an operator represented by the current node has not yet been processed.

18. The computer program product of claim 16, wherein determining that the node identifier of the current node does not equal the default node identifier value comprises determining that an operator represented by the current node has already been processed.

19. The computer program product of claim 16, wherein determining that the node identifier of the current node does not equal the default node identifier value comprises determining that the current node has multiple parent nodes and has already been visited based on processing of one of the parent nodes.

20. The computer program product of claim 15, wherein the query plan tree is a directed acrylic graph.

* * * * *